United States Patent
Bowen et al.

(10) Patent No.: US 9,084,949 B2
(45) Date of Patent: Jul. 21, 2015

(54) WATER PURIFICATION SYSTEM

(75) Inventors: Micah C. Bowen, South Windsor, CT (US); Joseph R. Conti, Stormville, NY (US); Amanda L. Fortus, Cranford, NJ (US); Andrew M. Labrie, Westfield, MA (US); Robert T. T. Gettens, Longmeadow, MA (US); James C. McKeon, Longmeadow, MA (US); Glenn E. Vallee, Westbrook, CT (US); Matthew M. McCormack, Middlefield, CT (US); Michael J. Grinaski, Ellington, CT (US)

(73) Assignee: WESTERN NEW ENGLAND UNIVERSITY, Springfield, MA (US)

( * ) Notice: Subject to any disclaimer, the term of this patent is extended or adjusted under 35 U.S.C. 154(b) by 461 days.

(21) Appl. No.: 13/480,621

(22) Filed: May 25, 2012

(65) Prior Publication Data

US 2012/0292260 A1    Nov. 22, 2012

Related U.S. Application Data

(63) Continuation-in-part of application No. 13/403,165, filed on Feb. 23, 2012.

(60) Provisional application No. 61/446,112, filed on Feb. 24, 2011.

(51) Int. Cl.
| | |
|---|---|
| *C02F 1/32* | (2006.01) |
| *B01D 17/00* | (2006.01) |
| *C02F 1/00* | (2006.01) |
| *C02F 1/28* | (2006.01) |

(52) U.S. Cl.
CPC ................ *B01D 17/08* (2013.01); *C02F 1/002* (2013.01); *C02F 1/003* (2013.01); *C02F 1/283* (2013.01); *C02F 1/325* (2013.01); *C02F 2201/009* (2013.01); *C02F 2201/3223* (2013.01); *C02F 2201/3225* (2013.01); *C02F 2303/04* (2013.01)

(58) Field of Classification Search
CPC ............ B01J 19/08; C02F 1/325; C02F 1/32; C02F 2009/44; C02F 2201/3221; C02F 2209/40; B01D 17/00
USPC ............ 210/748.01, 748.11, 192, 198.1, 251, 210/143; 422/20, 22, 24, 186, 186.3, 243, 422/119; 320/101; 250/432 R
See application file for complete search history.

(56) References Cited

U.S. PATENT DOCUMENTS

| | | | |
|---|---|---|---|
| 6,987,327 B1 * | 1/2006 | Lucatero | 290/1 A |
| 7,488,423 B2 * | 2/2009 | Wismer et al. | 210/663 |

(Continued)

*Primary Examiner* — Walter D Griffin
*Assistant Examiner* — Cameron J Allen
(74) *Attorney, Agent, or Firm* — Cantor Colburn LLP

(57) ABSTRACT

A water treatment system is provided. The system includes a first container and a pump fluidly coupled to the first container. A filter is fluidly coupled to the pump opposite the first container. A valve having an inlet fluidly is coupled to the filter opposite the pump, the valve having a first outlet fluidly coupled to the first container and a second outlet. At least one UV germicidal light is fluidly coupled to the second outlet, wherein a fluid from the second outlet flows over at least a portion of the length of the at least one UV germicidal light. A second container is fluidly coupled to the second conduit. At least one electrical generator is configured to couple with a bicycle, the at least one electrical generator being electrically coupled to provide electrical power to the at least one UV germicidal bulb and the pump.

19 Claims, 14 Drawing Sheets

(56) References Cited

U.S. PATENT DOCUMENTS

| | | | |
|---|---|---|---|
| 7,754,090 B1* | 7/2010 | Berg | 210/748.01 |
| 8,048,370 B1 | 11/2011 | Barnes | |
| 2002/0113022 A1* | 8/2002 | Gadgil et al. | 210/748 |
| 2005/0258108 A1* | 11/2005 | Sanford | 210/748 |
| 2005/0279679 A1* | 12/2005 | Baarman | 210/143 |
| 2007/0035134 A1* | 2/2007 | Bristow | 290/1 R |
| 2008/0041775 A1* | 2/2008 | Baarman | 210/143 |
| 2011/0104017 A1* | 5/2011 | Migliore et al. | 422/186.3 |

\* cited by examiner

WATER PURIFICATION SYSTEM

The present application is a Continuation-In-Part application of U.S. application Ser. No. 13/403,165 filed on Feb. 23, 2012, which claims the benefit of U.S. Provisional Application Ser. No. 61/446,112, filed Feb. 24, 2011, the contents of which is incorporated by reference herein.

BACKGROUND OF THE INVENTION

The subject matter disclosed herein relates to a water purification system and in particular to a water purification system with two stages of purification that is powered by a bicycle.

Having access to clean water is desirable to healthy living. Unclean or dirty water can lead to illness and may be potentially fatal. It has been estimated that over 1.1 billion people in developing countries lack access to clean water. There are many different ways to purify water, including boiling, chemicals, or UV light. Boiling is the most popular method of purifying water. The issue with boiling is the amount fuel, whether it be electricity, wood, gas or chemicals for example, that is required to heat the water. Fuel is expensive and therefore a problem for families living developing or third world countries. Further, existing water purification systems are expensive to purchase, operate and maintain.

While existing water treatment systems are suitable for their intended purposes a need to improvement remains, particularly in the providing of an inexpensive water treatment system that is able to kill bacteria and viruses in addition to removing contaminants such as dirt or sand.

BRIEF DESCRIPTION OF THE INVENTION

According to one aspect of the invention, a water treatment system is provided having a first container. A pump is fluidly coupled to the first container. A filter is fluidly coupled to the pump opposite the first container. A valve having an inlet is fluidly coupled to the filter opposite the pump, the valve having a first outlet fluidly coupled to the first container and a second outlet. At least one UV germicidal light is fluidly coupled to the second outlet, wherein a fluid from the second outlet flows over at least a portion of the length of the at least one UV germicidal light. A second container is fluidly coupled to receive the fluid from the at least on UV germicidal light. At least one electrical generator is configured to couple with a bicycle, the at least one electrical generator being electrically coupled to provide electrical power to the at least one UV germicidal light and the pump.

According to another aspect of the invention, a water treatment system powered by a bicycle is provided. The system includes a frame having at least one coupler configured to suspend a driven wheel of the bicycle to rotate freely, the frame having a first member and a second member. A roller is rotationally coupled to the frame, the roller being further configured to move between a first position and a second position to engage the driven wheel. At least one generator is operably coupled to the roller. At least one pump is operably coupled to the roller. At least one UV germicidal light is fluidly coupled to the at least one pump and electrically coupled to the at least one generator, the at least on UV germicidal light having a bulb portion having a length, wherein the bulb portion is arranged to flow a fluid over the length. A valve having an inlet is fluidly coupled to the at least one pump, a first outlet fluidly coupled to the bulb portion and a second outlet, wherein the valve is configured to flow fluid through the first outlet when a rotational speed of the roller is equal to or greater than a predefined speed and through the second outlet when the rotational speed of the roller is less than a predetermined speed.

According to yet another aspect of the invention, a method of purifying water is provided. The method includes the step of providing a frame configured to couple to a bicycle to allow a driven wheel to rotate freely. A roller is provided that is operably coupled to the frame. A pump is provided that is coupled to a first end of the roller. A generator is provided that is coupled a second end of the roller opposite the pump, the generator being arranged to rotate in response to a rotation of the roller. The roller is moved to engage the driven wheel. Water is flowed with the pump when the bicycle is being operated. The bicycle is pedaled for a predetermined amount of time. At least one UV germicidal light is powered when the bicycle is being operated. Water flows over a bulb portion of the at least one UV germicidal light.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
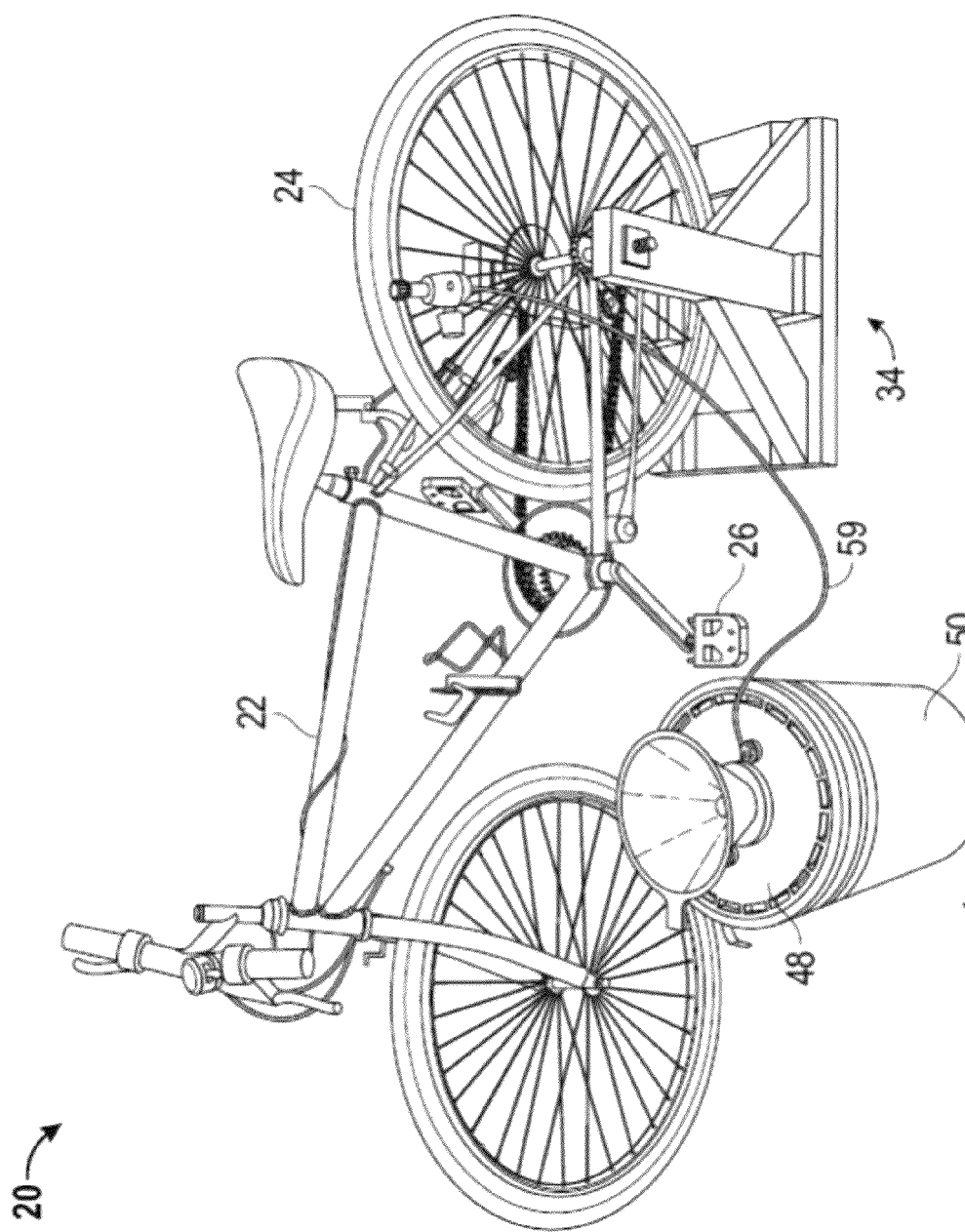
FIG. 1 is a perspective view illustration of a water treatment system in accordance with an embodiment of the invention.
Figure 2:
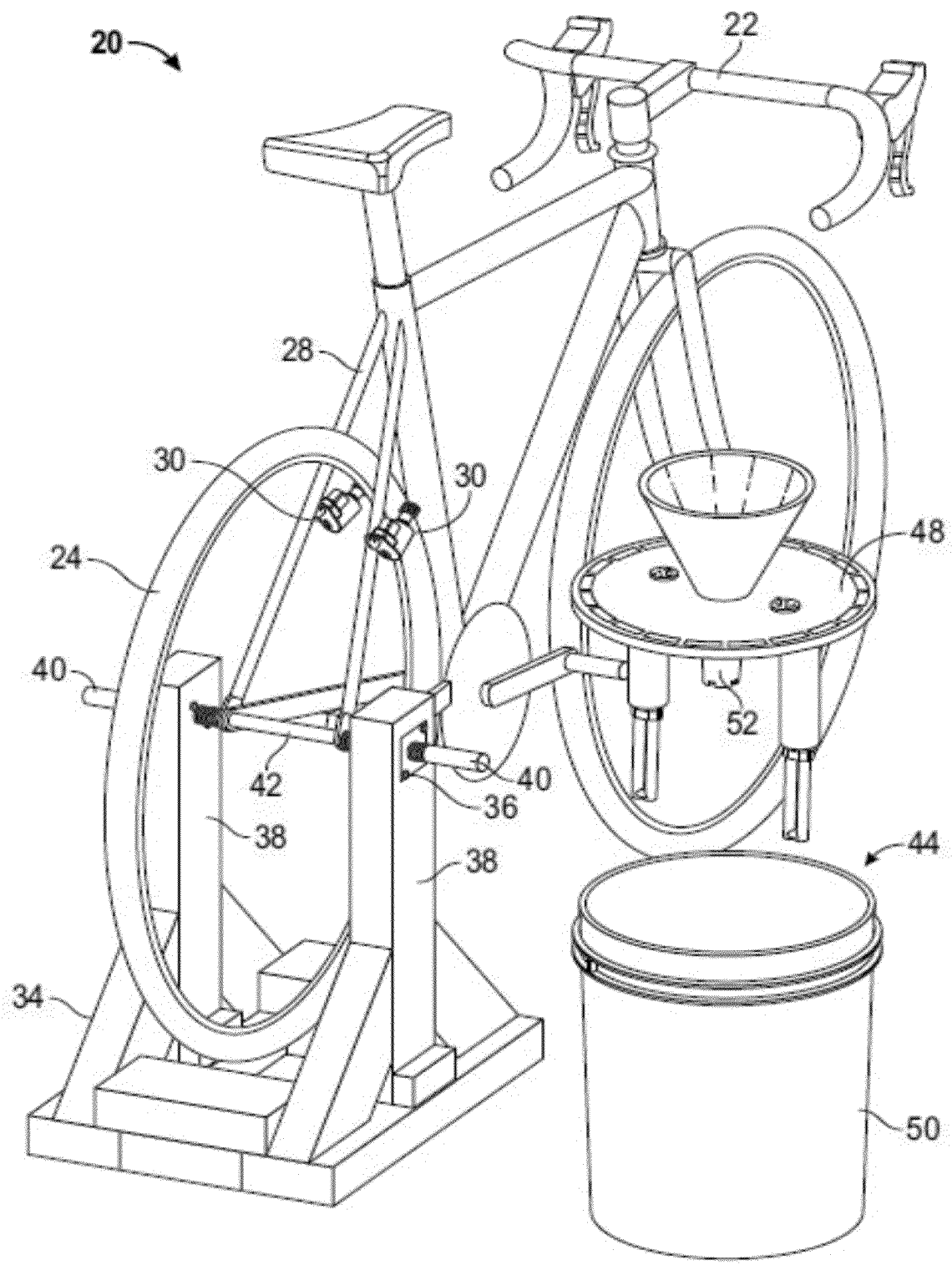
FIG. 2 is another perspective view illustration of the water treatment system of FIG. 1.
Figure 3:
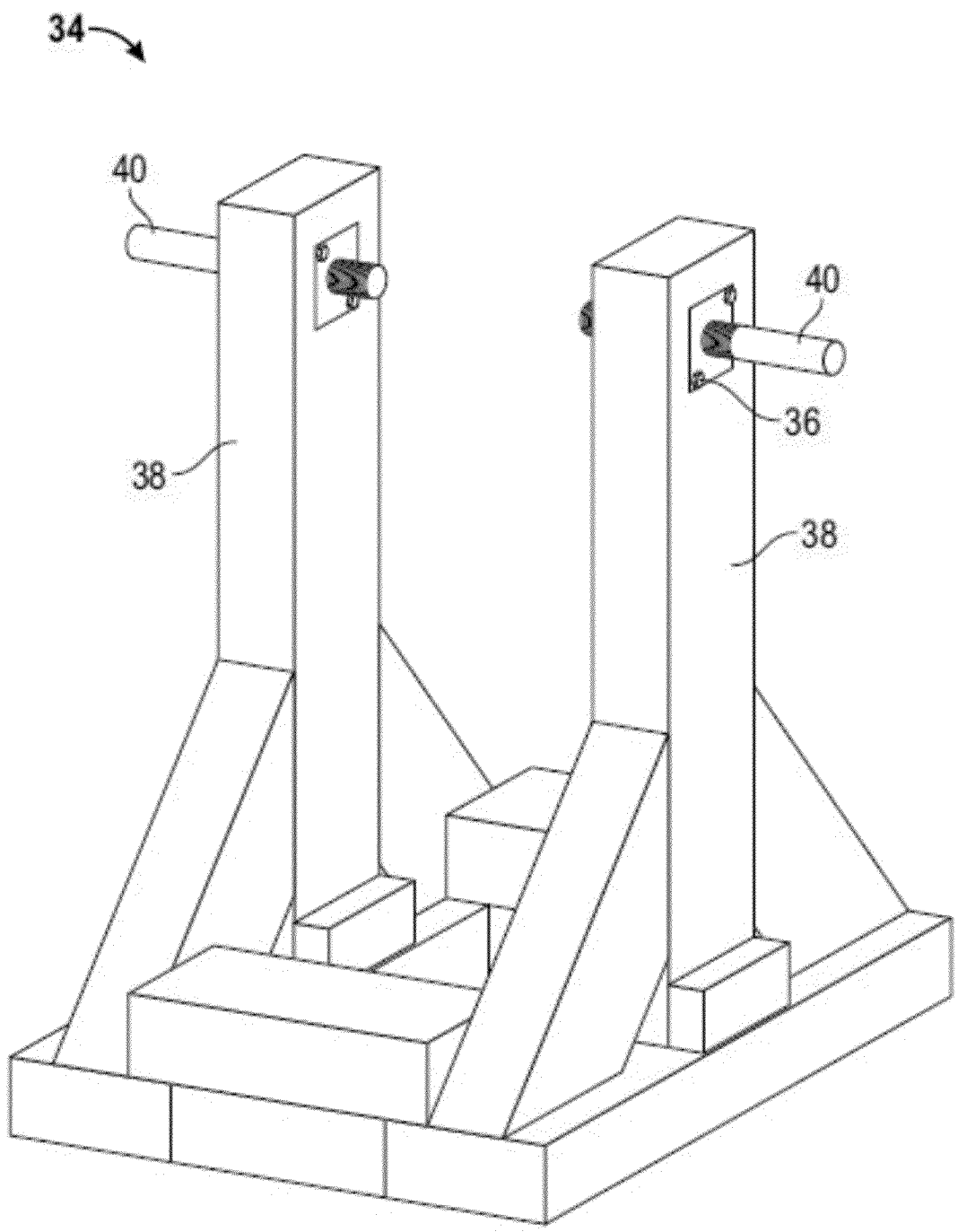
FIG. 3 is a perspective view illustration of a bicycle stand for use with the water treatment system of FIG. 1.
Figure 4A:
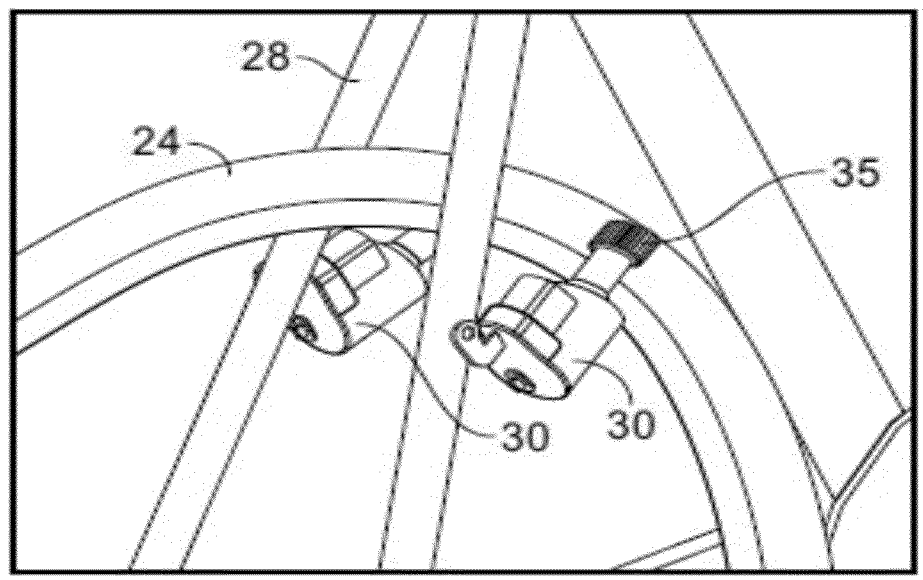
FIG. 4 is a partial perspective view illustration of a bicycle electrical generator arrangement for the water treatment system of FIG. 1.
Figure 4B:
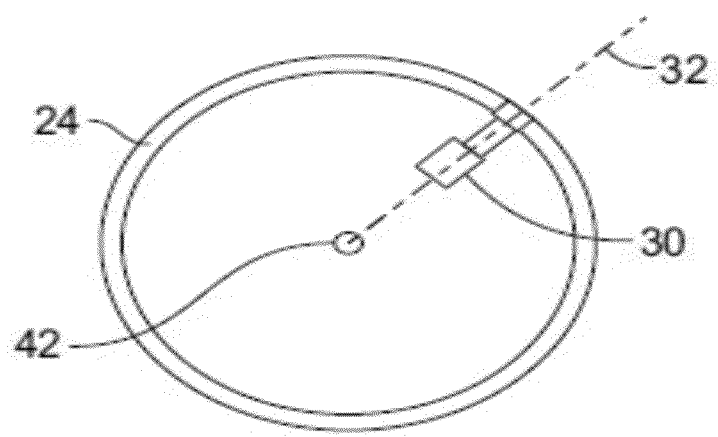
Figure 5:
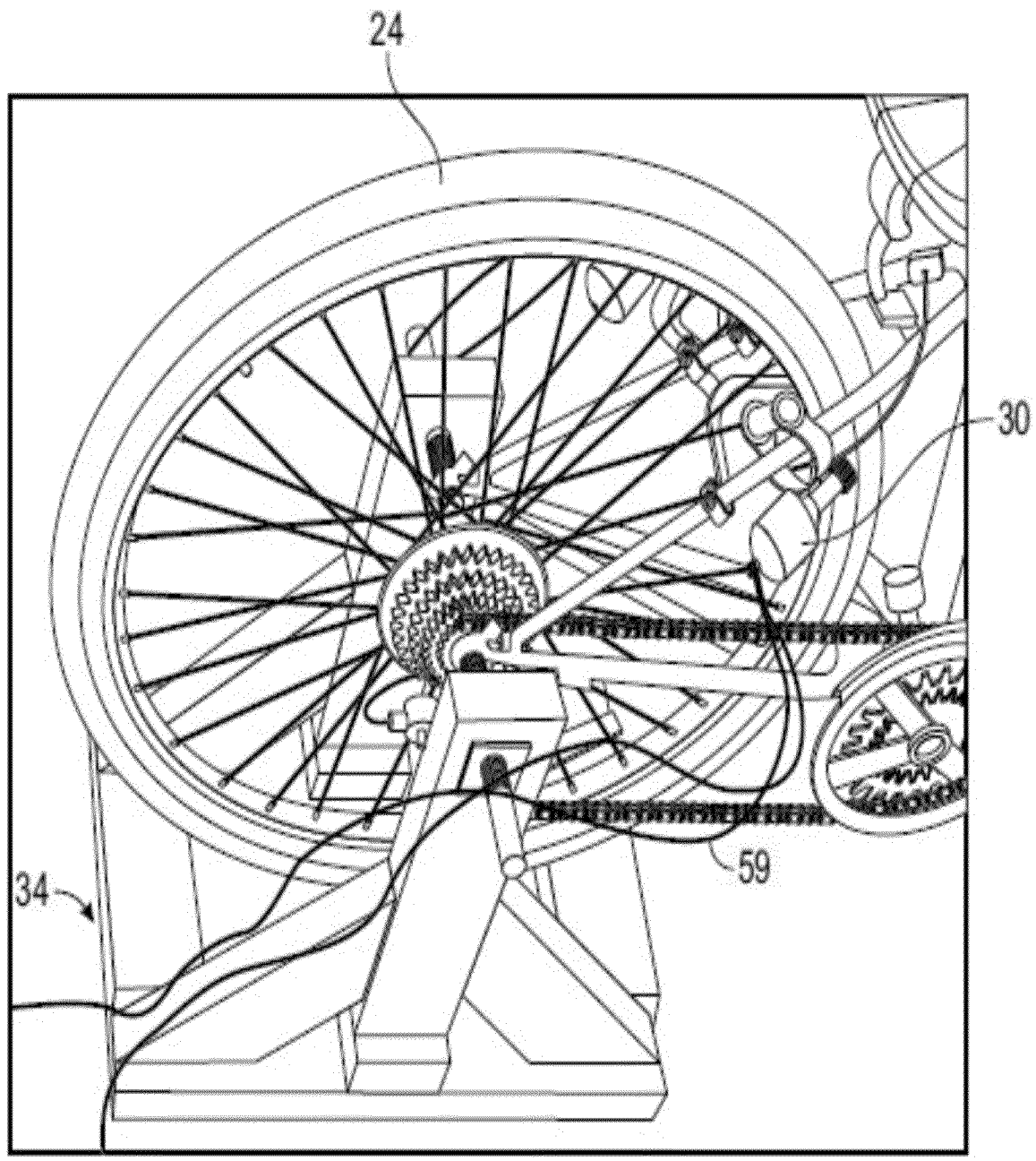
FIG. 5 is a partial perspective view illustration of a bicycle mounted to the stand of FIG. 3.
Figure 6:
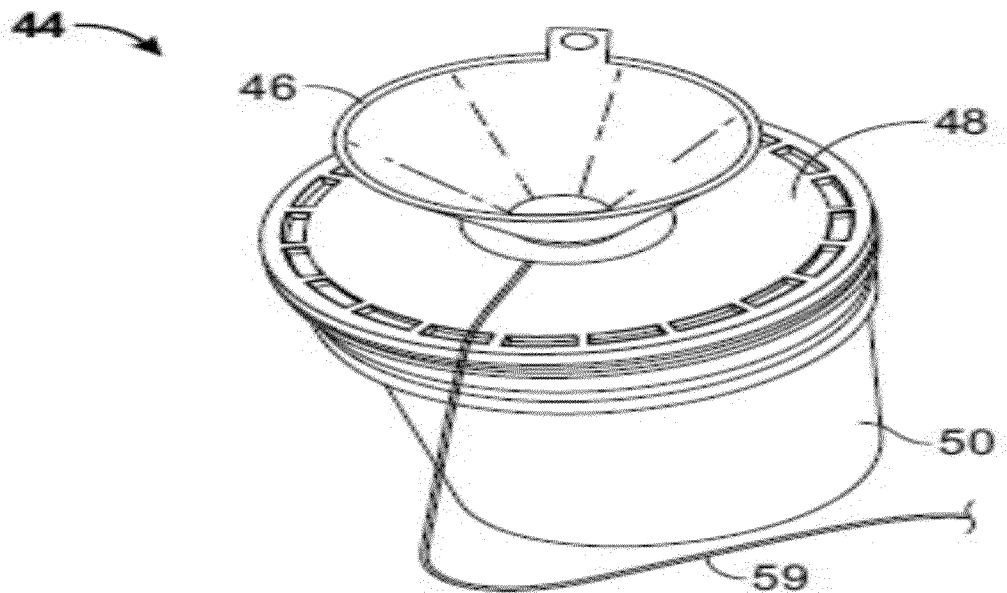
FIG. 6 is a perspective view illustration of the water container and purifier assembly for the water treatment system of FIG. 1.
Figure 7:
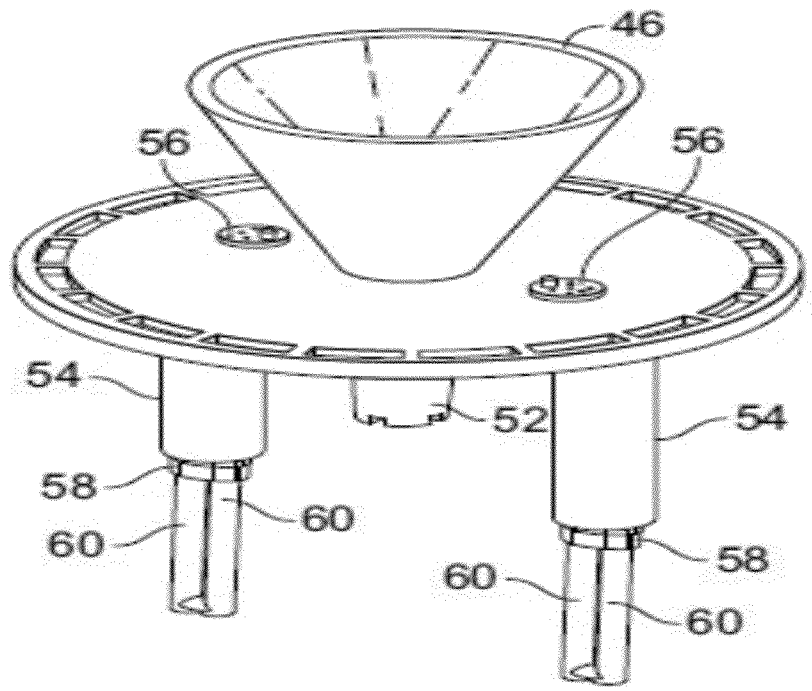
FIG. 7 is a perspective view illustration of a portion of the water container and purifier assembly of FIG. 6.
Figure 8:
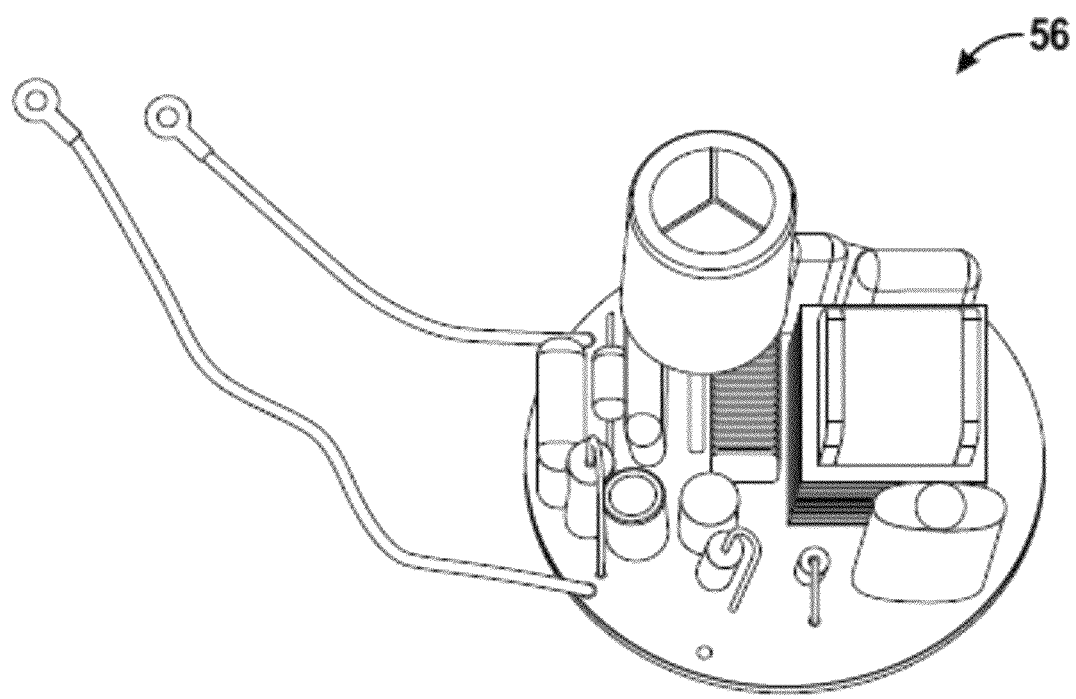
FIG. 8 is a perspective view illustration of the AC/DC power converter for use in the water container and purifier assembly of FIG. 6.

The detailed description explains embodiments of the invention, together with advantages and features, by way of example with reference to the drawings.

DETAILED DESCRIPTION OF THE INVENTION

Access to pure water is desirable to prevent the contracting of diseases that may lead to illness or death. A portable mechanically powered water purification system is provided that provides advantages in being easy to use, low in cost, and high in effectiveness and durability. The purification system may be transported to the location where it is needed making it easier for users to purify their water in a convenient place. The purification system is able to treat sufficient water for a two people for an entire day in a short period of time.

An exemplary embodiment of a water purification system 20 is shown in FIGS. 1-8. The purification system 20 includes a bicycle 22 having a driven wheel 24 suspended above the ground to keep the bicycle 22 stationary while an operator pushing on the bicycle pedals 26 rotates the wheel 24. Attached to the bicycle frame 28 is a pair of dynamo generators 30 located on opposite sides of the wheel 24. In one embodiment, the longitudinal axis of the generators 30 lies on a radial line 32 passing through the axis of the wheel 24 as shown in FIG. 4B. This provides advantages in reducing friction forces within the generator 30 and therefore provides advantages in increasing efficiency.

Each generator 30 includes a roller 35 that rests against the side-wall of the wheel 24. As the wheel 24 is rotated, the roller 35 rotates due to the friction between the wheel and the roller. The rotation of the roller 35 in turn rotates a dynamo to generate electricity. In the exemplary embodiment, the generators 30 generate at least 12 volts-6 watts of electrical power when the bicycle pedal is rotated at 60 rotations per minute. In one embodiment, the generator 30 may be a Dymotec S12 manufactured by Busch-Muller Company.

The bicycle wheel 24 is suspended by a frame 34. In the exemplary embodiment, the frame 34 uses approximately 15 feet (4.57 meters) of lumber with the standard cross section of 2 inches by 4 inches (5.1 centimeters by 10.2 centimeters) Within in the frame 34 are two 2 inches by 2 inches by 0.5 inches (5.1 cm by 5.1 cm by 1.27 cm) steel blocks 36 that are drilled and tapped for a ¾-10 thread (M12×1.5 metric thread). The two steel blocks 36 sit flush with the outside edge of the two main vertical bike supports 38. There are two 6 inch by ¾ inch steel rods 40 that are threaded with a length of 4." The threaded end includes a bored half inch diameter hole to a depth of ¾." The bicycle 22 rear axle nuts (not shown) are removed and the axle 42 is lined up with the bored hole at the end of the steel rods 40. The rods 40 are then tightened till overlapping the axle 42 and compressing the frame 28 of the bicycle 22.

Arranged adjacent the bicycle 22 is a filtration system 44. The filtration system 44 includes a funnel 46 that holds and directs water provided by the user. The funnel 46 is coupled to a cover 48 that is sized to be removably coupled to a container 50. The funnel 46 directs the water provided by the user through cover 48 into a filter 52. In the exemplary embodiment, the filter 52 is an activated carbon filter, such as a Brita® water filter manufactured by The Clorox Company. The water enters filter 52 on an end adjacent the cover 48 and flows out an opposite end into the container 50. The filter 52 removes particulate contaminants from the water provided by the user, such as but not limited to chlorine, volatile organic compounds, toxic metals and other sediment. In one embodiment, the filter 52 may remove approximately 99.9% of dirt, sand and larger debris. In the exemplary embodiment, the filter 52 is sized to treat approximately 40 gallons of water. As will be discussed below, the filter increases the efficiency of a UV-C germicidal bulb. If the sediment remained in the water, the contamination could block the penetration of the UV rays to any bacteria or virus suspended in the water.

A pair of power converters 56 are coupled to the cover 48 and are arranged to receive electrical power from the generators 40 by a wiring harness 59 for example. The power converters 56 adapt the output of the generator 40 to have the electrical characteristics (e.g. converts from DC to AC electricity) needed for a UV-C germicidal bulb as will be described in more detail below. It should be appreciated that while the power converters 56 are shown coupled to the cover, they may be arranged in any other convenient location, such as on the generators 30 for example. Coupled to the cover 48 opposite the filter 46 are two conduits 54. In the exemplary embodiment, the conduits are six inch polyvinyl chloride (PVC) pipe.

The conduits 54 have a hollow interior that allows an electrical connection between an power converter 56 and an electrical bulb base 58 disposed on an end of the conduit 54. In one embodiment, the bulb base 58 is a G23 two pin florescent bulb bases. In the exemplary embodiment, the connection between the conduit 54 and the base 58 is sealed to inhibit the infiltration of water into the conduit 54. Two UV-C germicidal bulbs 60 are then coupled to the bulb base 58. In the exemplary embodiment, the bulbs 60 are a 7 W UV-C germicidal bulbs such as a model GPX7 bulb manufactured by Ushio America, Inc. The conduits 54 off set the bulbs 60 from the cover 48 such that the bulbs 60 are disposed in the container 50 at a level where the bulbs 60 are submerged within the filtered water. In the exemplary embodiment, the bulbs 60 are sized and configured to treat water for 8000 hours of use. In one embodiment, the bulbs 60 will kill 99.9% of all disease causing bacteria and viruses.

During operation, the user connects the bicycle 22 to the frame 34 as described above. The user then provides water, such as that obtained from a local well or river for example, and pours it into the funnel 46. In the exemplary embodiment, the user provides approximately 4.6 gallons of water. The water flows through the funnel 46 and the filter 52 where contaminants such as sediment are removed. The user then mounts the bicycle and pedals at a desired rate to provide sufficient electrical power to the bulbs 60. In the exemplary embodiment, the user pedals at approximately 60 rpm to power the bulbs 60 for approximately eight minutes. The bulbs 60 emit ultraviolet light into the filtered water to kill disease causing bacteria and viruses. Powering the bulbs 60 for eight minutes will produce 4.6 gallons of cleaned water. After the bulbs 60 have been powered for the desired amount of time, the user may remove the cover 50 and transfer the cleaned water to a desired storage container. This process may then be repeated as needed to obtain the desired amount of water. In one embodiment, the operator may be provided with a testing kit to verify the potability of the purified water.

Referring now to FIGS. 9-16, another embodiment of the water purification system 20. In this embodiment, the system 20 includes a frame 34 formed from a light weight material, such as polyvinyl chloride pipe for example. The frame 34 includes a pair of base members 70 that are substantially parallel and spaced apart. A pair of first side members 72, 74 are arranged on an angle with each member 72, 74 having an end coupled to one of the base members 70 adjacent a first side 76. A pair of second side member 78, 80 are provided that are also arranged on angle with each of the members 78, 80 being coupled on one end to one of the base members 70 adjacent a second side 82.

Figure 9:
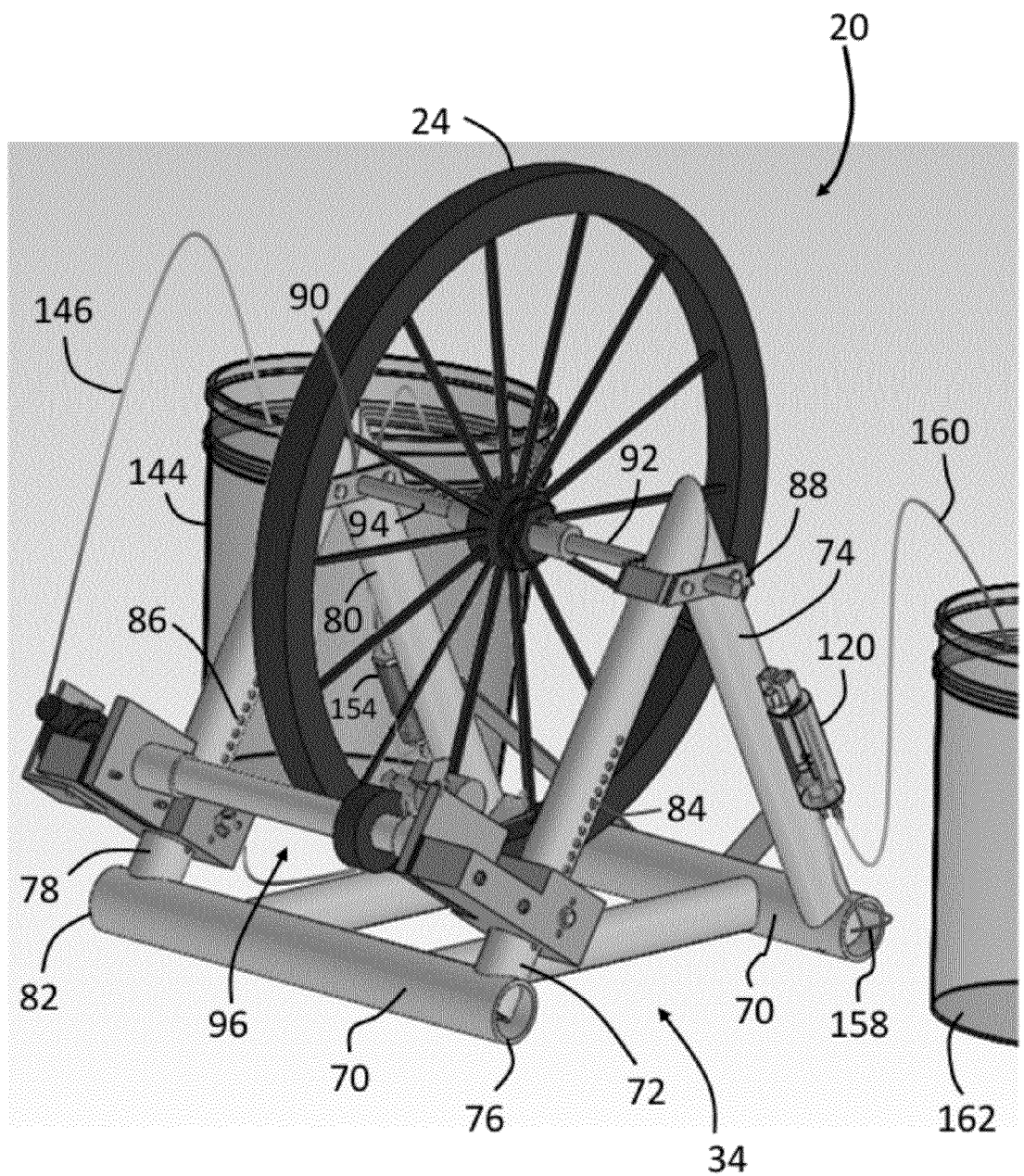
FIG. 9 is a perspective view illustration of a water treatment system in accordance with another embodiment of the invention.
Figure 10:
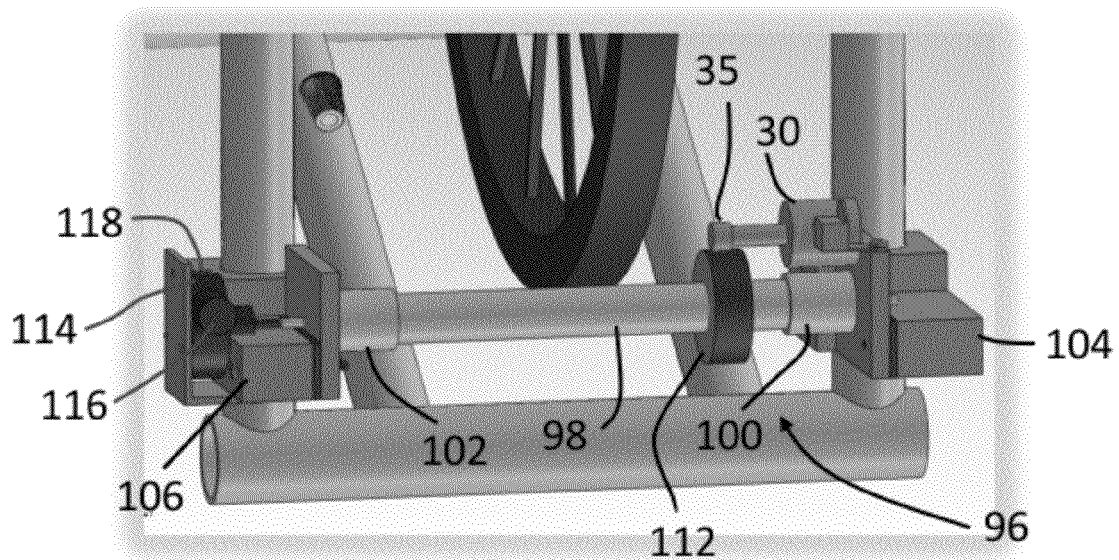
FIG. 10 is a perspective view illustration of a roller assembly for use with the water treatment system of FIG. 9.
Figure 11:
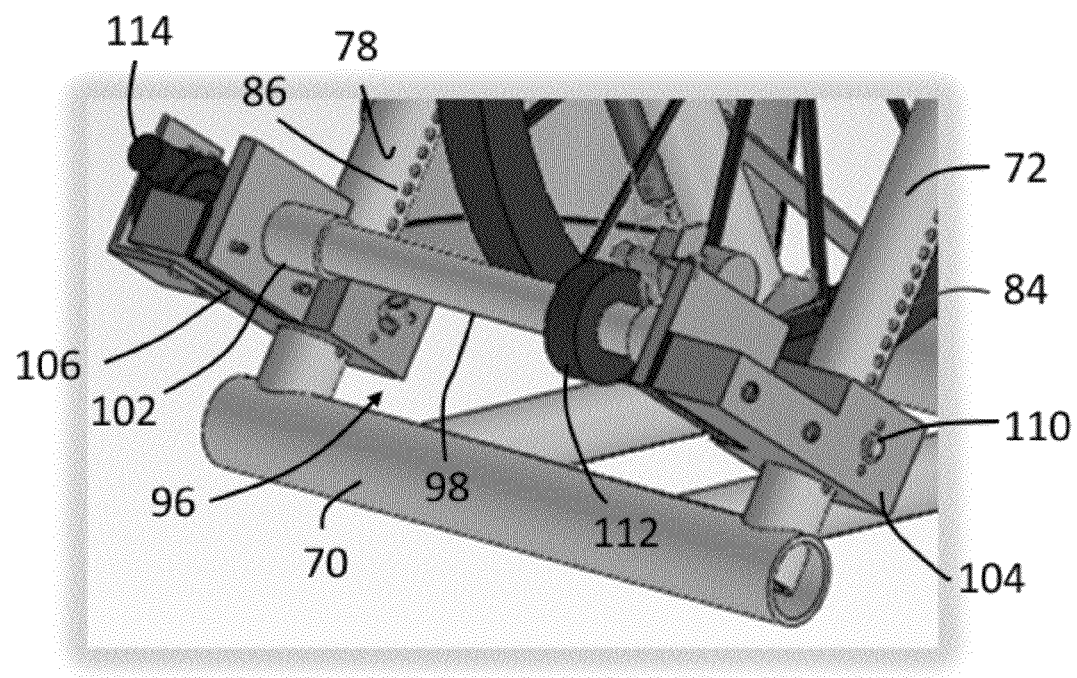
FIG. 11 is another perspective view illustration of the roller assembly of FIG. 10.
Figure 12:
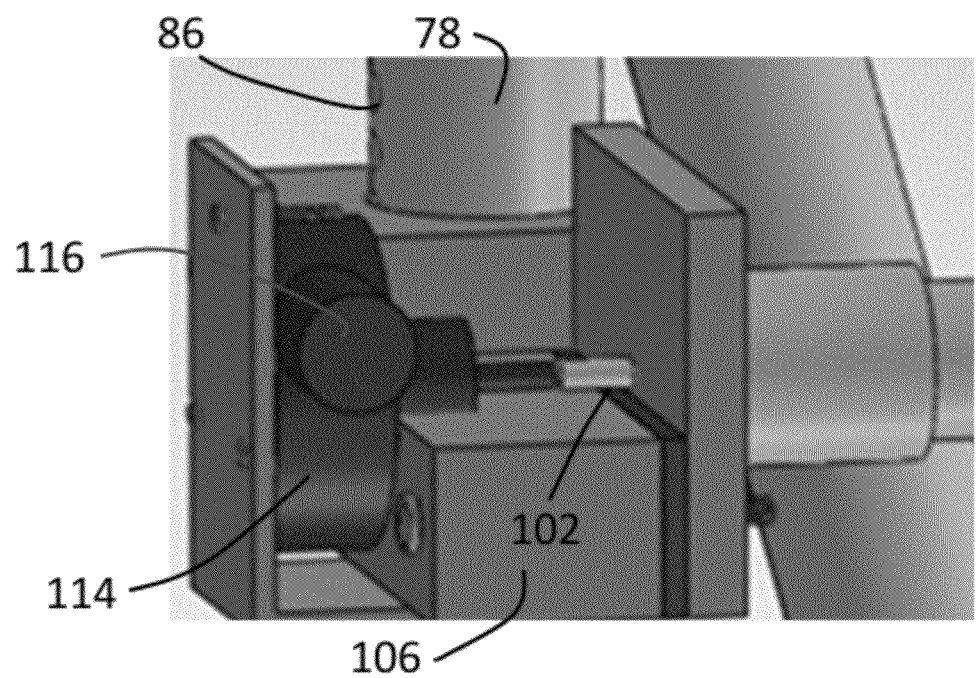
FIG. 12 is an enlarged view of the pump and roller connection for the roller assembly of FIG. 10.
Figure 13:
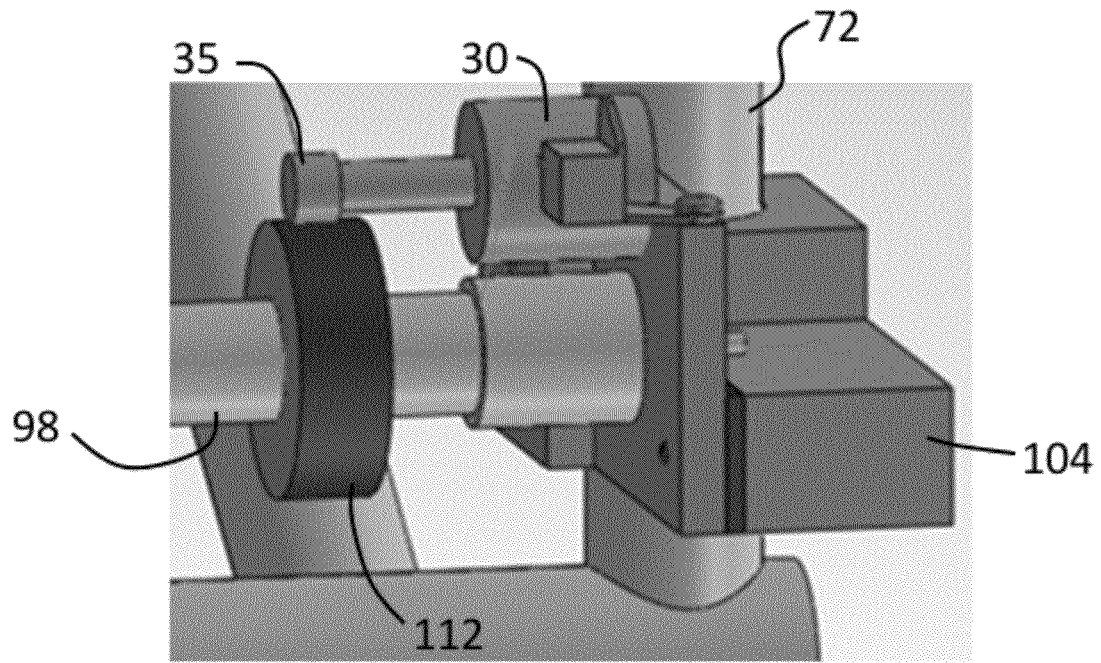
FIG. 13 is an enlarged view of the generator and roller connection for the roller assembly of FIG. 10.

The members 72, 78 both have a plurality of holes 84, 86 respectively. As will be discussed in more detail below, the holes 84, 86 allow the system 20 to be adapted to a variety of bicycle sizes. The system 20 further includes a pair of brackets 88, 90 arranged at the joint of the members 72, 74 and the member 78, 80 respectively. The brackets 88, 90 are arranged to allow a shaft 92, 94 to extend between the brackets 88, 90 and the bicycle wheel 24. Similar to the embodiment of FIGS. 1-3, the coupling of the shafts 92, 94 allows wheel 24 to be suspended off the ground and rotate freely. It should be appreciated that the wheel 24 illustrated in FIG. 9 is coupled to a bicycle 22, which was omitted for purposes of clarity.

A roller assembly 96 is coupled between the members 72, 78. The roller assembly 96 includes a shaft or roller 98. In one embodiment, the roller 98 is made from a polyvinyl chloride pipe. The roller 98 is supported by bearings 100, 102 coupled to a pair of blocks 104, 106. In one embodiment, each of the blocks 104, 106 include an opening 108 that is sized to receive the members 72, 78. The blocks 104, 106 each have a fastener, such as bolt 110 for example, that extend through the respective blocks 104, 106 and the holes 84, 86 to couple the blocks 104, 106 to the members 72, 78. To adjust the position of the roller assembly 96 to bring the roller 98 into or out of engagement with the wheel 24, the operator only has to remove the bolts 110 and slide the blocks 104, 106 along the members 72, 78. In one embodiment, the blocks 104, 106 are made from a pressure treated wood.

Coupled to the block 104 by a bracket is an electrical generator 30. The electrical generator 30 includes a roller 35 that engages a disk member 112 such that the roller 35 rotates in response to the rotation of the roller 98. In one embodiment, the generator 30 is rotated at 3000 rpm to achieve the desired output. This rotational speed may be achieved with a bicycle having a 26 inch diameter wheel 24, when the roller 93 has a diameter of 1.3 inches, the disk 112 has a diameter of 3 inches, the dynamo shaft has a diameter of 0.75 inches and the operator pedals at the equivalent speed of 5 miles per hour. In this embodiment, the generator 30 will generate at least 19.1 volts RMS-8 watts of electrical power when the bicycle pedal is rotated at 60 rotations per minute. In one embodiment, the generator 30 may be a model 34338 manufactured by Tung Lin Company. Mounted to the block 106 is a pump 114. The pump 114 is arranged to directly couple and be driven by the roller 98. In one embodiment, the pump 114 is a model WDP21S manufactured by Wayne Water Systems. The pump 114 includes an inlet 116 and an outlet 118 and is arranged to flow water in response to the rotation of the roller 98.

Figure 14:
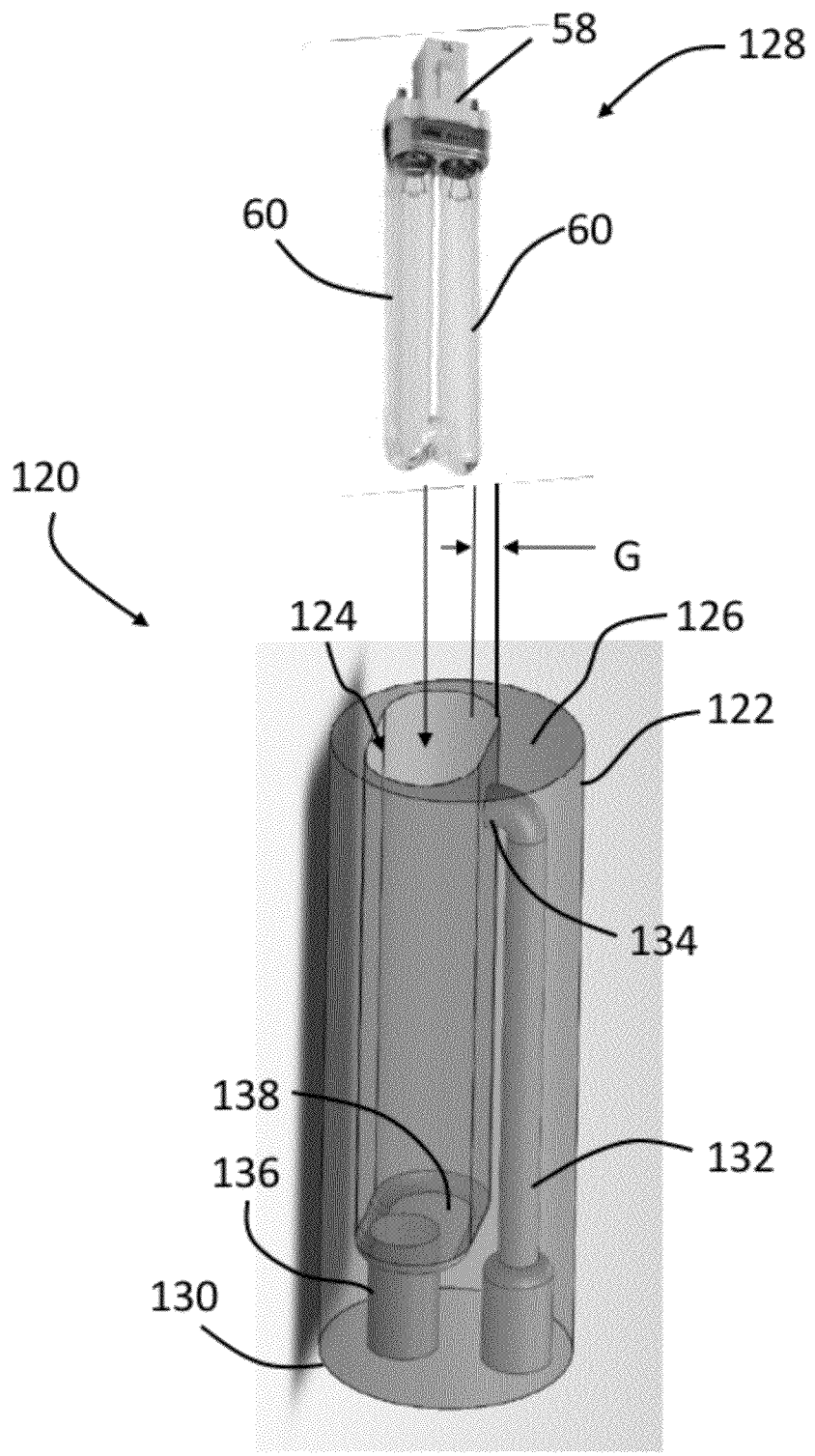
FIG. 14 is an exploded view of a water purification assembly for use with the water treatment system of FIG. 9.
Figure 15:
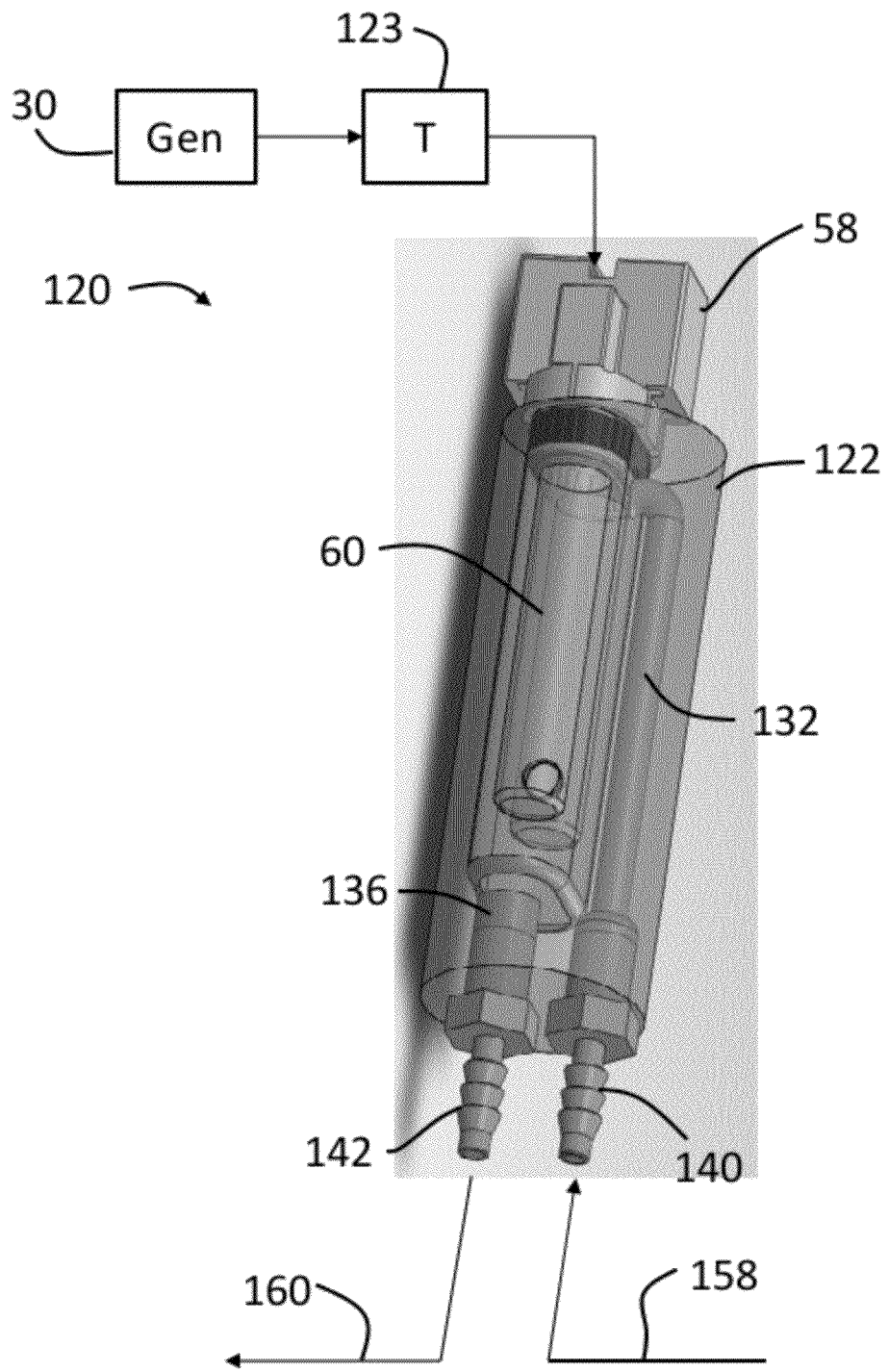
FIG. 15 is a perspective view of the water purification assembly of FIG. 14.
Figure 17:
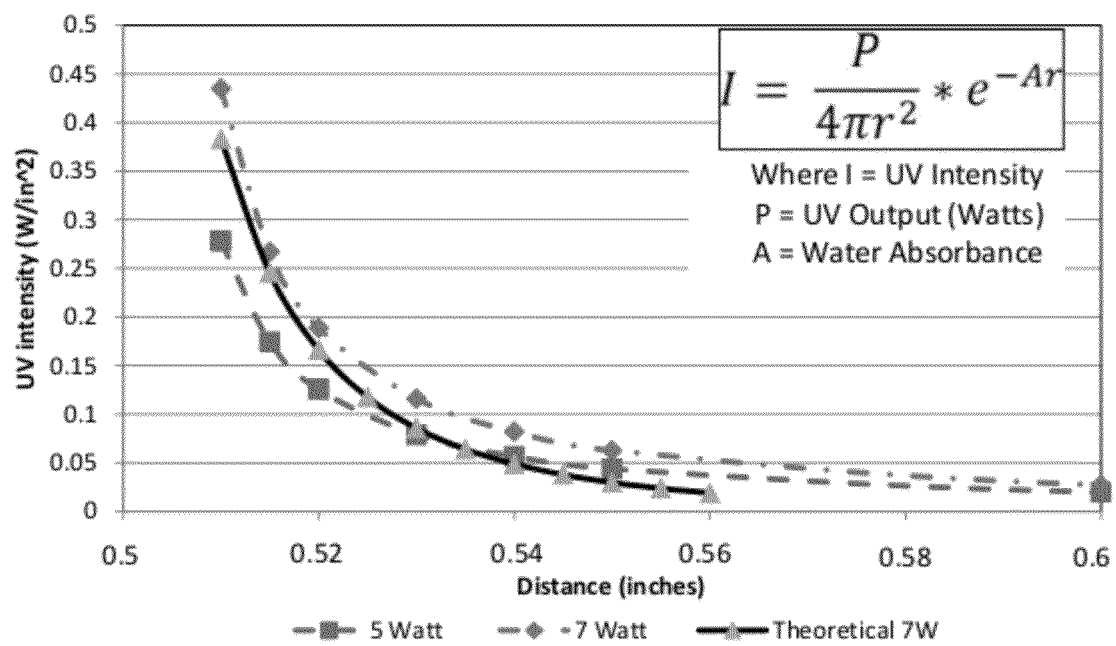

Referring now to FIG. 14 and FIG. 15 an embodiment is shown of a water purification assembly 120. It has been found that exposing bacteria and viruses to Ultaviolet-C (UVC) radiation is effective in inactivating these contaminants. The UVC radiation is between 200 and 280 nanometers of wavelength and in one embodiment the assembly 120 provides a UVC radiation having a wavelength of 254 nanometers. It has been further found that UV intensity varies exponentially with distance (FIG. 17). Therefore it is desirable to place the water to be purified close to the UVC source for a period of time to increase the effectiveness of the purification process. The level or dosage of UVC exposure needed to inactivate a bacteria or virus will depend on the contaminant involved. For example, to achieve a 99.9% reduction, a *salmonella typhosa* (typhoid) bacteria needs 0.0387 W/in$^2$, an *Escherichia coli* bacteria needs 0.0452 W/in$^2$, a *pseudomonas fluorescens* needs 0.0429 W/in$^2$, and a rotavirus needs 0.1548 W/in$^2$. In one embodiment, it is desirable to provide a dosage of at least 0.155 W/in$^2$ dosage during the purification process.

To achieve this level of dosage, the embodiment of FIG. 14 and FIG. 15 provides a housing 122 having an opening 124 on a first end 126. The opening 124 is generally oblong in shape and sized to receive the bulb portion 60 of the UVC germicidal light 128. In one embodiment, the opening is sized such that there is a gap "G" between the bulb portion 60 and the side of the opening 124 of less than or equal to 0.5 inches. In another embodiment, the gap "G" is less than or equal to 0.35 inches. In one embodiment, the UVC germicidal light 128 is a model G23 7 Watt light manufactured by Philips Corporation having a bulb portion 60 with a length of 3.5 inches. As will be discussed in more detail below, the gap "G" provides advantages in keeping the water being purified within a range of the UVC germicidal light 128 such that the water is exposed to the desired dosage of UVC light to inactivate the desired contaminant.

On a second end 130, the housing includes another opening that connects with a conduit 132. The conduit 132 traverses the length of the housing 122 and has a terminal end 134 in the opening 124 adjacent the first end 126. The housing 122 further includes a second conduit 136 that extends from the bottom 138 of the opening through to the second end 130. The conduits 132, 136 cooperate with the opening 124 to cause the water being purified to flow along and in contact with the bulb portion 60 of the UVC germicidal light. In one embodiment, the water flows in through a fitting 140 (FIG. 15) into the conduit 132 and into the opening 124. The water passes along the length of the bulb portion 60 and exits through the second conduit 136 and another fitting 142. It should be appreciated that by allowing the water to flow along the length of the bulb portion 60 within a confined opening, the desired levels of UVC dosage may be achieved. In one embodiment, the flow rate is limited to less than or equal to 0.678 gallons per minute. This allows a purification time of 5 gallons in less than 8 minutes.

In one embodiment, a transformer 123 may be electrically coupled between the generator 30 and the bulb base 58. The transformer 123 may be a model 3FS28 manufactured by Tamura which provides a voltage gain of 1.7. In one embodiment, the UVC germicidal light 128 has a voltage requirement of 5-34 volts and a current of 0.2 amps.

Figure 16:
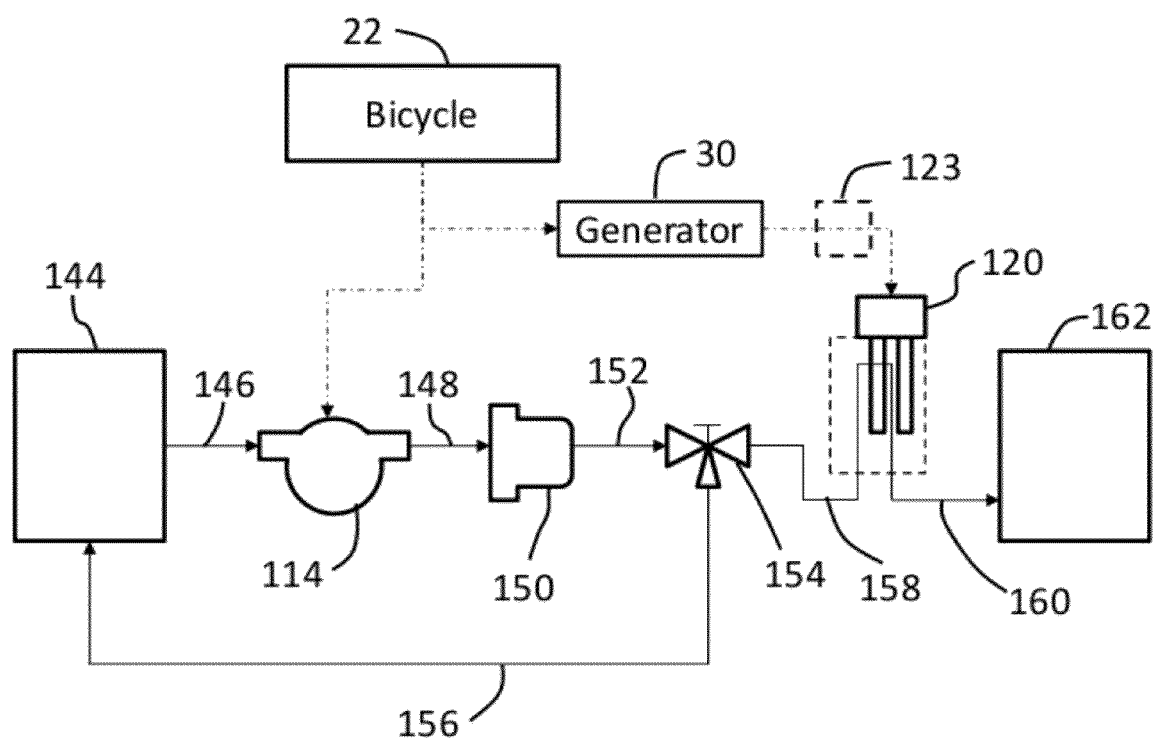
FIG. 16 is a schematic illustration of the water treatment system of FIG. 9; and, FIG. 17 is a plot illustrating the relationship between UV intensity versus distance.

Referring now to FIG. 9 and FIG. 16, the operation will be described of the water purification system 20. To purify water, such as that obtained from a water source such as a pond or a stream for example, the operator first fills a container 144 and inserts a conduit 146. A bicycle 24 is coupled to the frame 34 by coupling the shafts 92, 94 to the axle of the driven wheel 24. The operator then adjusts the position of the blocks 104, 106 such that the roller 98 is placed into contact with the wheel 24. When in this position, the roller 98 will rotate in response to the rotation of the wheel 24.

With the bicycle 22 coupled to the frame 34, the operator mounts the bicycle 22 and starts to pedal. Since the roller 98 is contact with the wheel 24, the pump 114 will also start to rotate. In the exemplary embodiment, the pump 114 is a self-priming pump and starts to draw water out of the container 144. The water leaves the pump 114 via a conduit 148 and is passed through a filter 150. In one embodiment, the filter 150 is a model GY20709 manufactured by Deere and Company. From the filter 150, the water flows via conduit 152 to a control valve 154 mounted to member 80. The valve 154 regulates the flow of water to the water purification assembly 120. Since the desired level of purification is achieved when the UVC germicidal light 128 is powered to a desired level, the valve 154 remains closed until the pump 114 has achieved a predetermined level of pressure. Since the pump 114 and the generator 30 are both driven by the roller 98, a pressure level may be used that corresponds with the desired level of dosage from the UVC germicidal light 128. In one embodiment, the valve 154 routes water via conduit 156 back to the container 144 until the pressure in conduit 152 reaches 13 psi. This corresponds to a roller speed of 1200 rpm, which is equivalent to 4.6 mile per hour of bicycle speed.

Once the bicycle is being operated at the desired level, the valve 154 opens to allow water to flow via conduit 158 to the water purification assembly 120 and the flow via conduit 156 is halted. The water flows into the housing 122 and through the opening 124 past the bulb portion 60 exposing the water to the UVC light and inactivating bacteria and viruses. The water flows through a conduit 160 to a second container 162. It should be appreciated that that water having been filtered and exposed to UVC light will be substantially purified and potable.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A water treatment system comprising:
    a first container;
    a pump fluidly coupled to the first container;
    a filter fluidly coupled to the pump opposite the first container;
    a valve having an inlet fluidly coupled to the filter opposite the pump, the valve having a first outlet fluidly coupled to the first container and a second outlet;
    at least one UV germicidal light spaced apart from the first container and fluidly coupled to the second outlet, wherein a fluid from the second outlet flows over, along and in direct contact with at least a portion of a length of the at least one UV germicidal light;
    a second container spaced apart from the at least one UV germicidal light, the second container having an inlet fluidly coupled to receive the fluid from the at least one UV germicidal light, wherein the fluid flows over the at least one UV germicidal light prior to entering the second container; and,
    at least one electrical generator configured to couple with a bicycle, the at least one electrical generator being electrically coupled to provide electrical power to the at least one UV germicidal light and the pump.

2. The water treatment system of claim 1 wherein the at least one UV germicidal light includes a bulb portion and the pump is configured to flow the fluid over the bulb portion at a rate equal to or less than 0.678 gallons/minute, wherein a volume of the fluid flowing over the bulb portion is within 0.35 inches of an outer surface of the bulb portion.

3. A water treatment system comprising:
    a first container;
    a pump fluidly coupled to the first container;
    a filter fluidly coupled to the pump opposite the first container;
    a valve having an inlet fluidly coupled to the filter opposite the pump, the valve having a first outlet fluidly coupled to the first container and a second outlet;
    at least one UV germicidal light fluidly coupled to the second outlet, wherein a fluid from the second outlet flows over at least a portion of a length of the at least one UV germicidal light, wherein the at least one UV germicidal light includes a bulb portion and the pump is configured to flow the fluid over the bulb portion at a rate equal to or less than 0.678 gallons/minute;
    a second container fluidly coupled to receive the fluid from the at least one UV germicidal light;
    at least one electrical generator configured to couple with a bicycle, the at least one electrical generator being electrically coupled to provide electrical power to the at least one UV germicidal light and the pump; and
    a housing having a first conduit fluidly coupled to the second outlet, an opening fluidly coupled to the first conduit at a first end, and a second conduit fluidly coupled to the opening at a second end opposite the first conduit, wherein the bulb portion is disposed within the opening.

4. The water treatment system of claim 3 wherein the opening is sized to provide a gap equal to or less than 0.35 inches between the opening and the bulb portion.

5. The water treatment system of claim 1 further comprising:
    a frame having a first member and a second member, the second member being offset from the first member by a gap sized to receive a bicycle wheel;
    a roller rotationally and movably coupled between the first member and the second member, wherein the roller is configured to selectively engage the bicycle wheel;
    wherein the at least one electrical generator is operably coupled to the roller adjacent the first member; and
    wherein the pump is operably coupled to the roller adjacent the second member; and
    wherein the valve is configured to flow fluid through the first outlet when a rotational speed of the roller is equal to or greater than a predefined speed and through a second outlet when the rotational speed of the roller is less than a predetermined speed.

6. The water treatment system of claim 5 further comprising a roller disk coupled between the roller and the at least one electrical generator.

7. The water treatment system of claim 5 wherein the first member includes a first plurality of openings and the second member includes a second plurality of openings, the roller being configured to selectively engage the first plurality of openings and the second plurality of openings to adjust a location of the roller to accommodate different size bicycle wheels.

8. The water treatment system of claim 5 wherein the pump is directly coupled to the roller.

9. A water treatment system powered by a bicycle comprising:
    a frame having at least one coupler configured to suspend a driven wheel of the bicycle to rotate freely, the frame having a first member and a second member;
    a roller rotationally coupled to the frame, the roller being further configured to move between a first position and a second position to engage the driven wheel;
    at least one generator operably coupled to the roller;
    at least one pump operably coupled to the roller;
    at least one UV germicidal light fluidly coupled to the at least one pump and electrically coupled to the at least one generator, the at least on UV germicidal light having a bulb portion having a length, wherein the bulb portion is arranged to flow a fluid over the length; and, a valve having an inlet fluidly coupled to the at least one pump, a first outlet fluidly coupled to the bulb portion and a second outlet, wherein the valve is configured to flow fluid through the first outlet when a rotational speed of the roller is equal to or greater than a predefined speed and through the second outlet when the rotational speed of the roller is less than a predetermined speed.

10. The water treatment system of claim 9 wherein the predetermined speed is 1200 revolutions per minute.

11. The water treatment system of claim 9 wherein the predetermined speed is selected to provide a flow rate of the fluid over the bulb portion equal to or less than 0.678 gallons/minute.

12. The water treatment system of claim 9 wherein the predetermined speed is selected to generate a UVC dosage of at least 0.155 W/in$^2$ at a 0.5 inch distance from the bulb portion.

13. The water treatment system of claim 9 further comprising a housing having an opening sized to receive the bulb portion, the housing having a second inlet adjacent a first end of the opening and fluidly coupled to the first outlet, the housing further having a third outlet a second end of the opening opposite the first end.

14. The water treatment system of claim 13 wherein the opening is sized to provide a gap of less than 0.5 inches from the opening to the bulb portion.

15. The water treatment system of claim 14 wherein the gap is about 0.35 inches.

16. A method of purifying water comprising:
providing a frame configured to couple to a bicycle to allow a driven wheel to rotate freely;
providing a roller operably coupled to the frame;
providing a pump coupled to a first end of the roller;
providing a generator coupled to a second end of the roller opposite the pump, the generator being arranged to rotate in response to a rotation of the roller;
moving the roller to engage the driven wheel;
flowing a water with the pump when the bicycle is being operated;
pedaling the bicycle for a predetermined amount of time;
powering at least one UV germicidal light when the bicycle is being operated;
flowing the water over a bulb portion of the at least one UV germicidal light;
providing a valve with a first inlet fluidly coupled to the pump, a first outlet fluidly coupled to the bulb portion, and a second outlet;
directing the water through the first outlet when a rotational speed of the roller is equal to or greater than a predetermined speed; and
directing the water through the second outlet when the rotational speed of the roller is less than the predetermined speed.

17. The method of claim 16 further comprising flowing the water over the bulb portion at a flow rate equal to or less than 0.678 gallons/minute.

18. The method of claim 16 further comprising generating a UVC dosage of at least 0.155 W/in$^2$ at 0.5 inches with the at least on UV germicidal light.

19. The method of claim 16 further comprising filtering sediment from the water received from the pump.

* * * * *